United States Patent
Vedhanarayanan

(10) Patent No.: US 9,420,445 B2
(45) Date of Patent: Aug. 16, 2016

(54) UNIVERSAL CODE FOR EMERGENCY CALLS MODE IN A NETWORK ENVIRONMENT

(71) Applicant: CISCO TECHNOLOGY, INC., San Jose, CA (US)

(72) Inventor: Praveen Kumar Vedhanarayanan, Chennai (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 283 days.

(21) Appl. No.: 14/150,535

(22) Filed: Jan. 8, 2014

(65) Prior Publication Data
US 2015/0195694 A1 Jul. 9, 2015

(51) Int. Cl.
*H04W 4/22* (2009.01)
*H04W 76/00* (2009.01)
*H04M 1/725* (2006.01)
*H04W 4/02* (2009.01)

(52) U.S. Cl.
CPC ............ *H04W 4/22* (2013.01); *H04M 1/72541* (2013.01); *H04W 76/007* (2013.01); *H04M 2250/10* (2013.01); *H04W 4/027* (2013.01)

(58) Field of Classification Search
CPC ... H04W 4/22; H04W 76/007; H04W 52/027; H04W 52/0261; H04W 12/06; H04W 48/02; H04W 4/001; H04W 4/02; H04M 1/72541; H04M 11/04; H04M 1/72536; H04M 2250/10; H04M 2250/12; H04M 2250/22; H04M 1/22; H04M 1/0202; H04M 1/72519; H04M 1/274566; H04M 1/665; H04M 1/667; H04M 1/673; H04M 2242/04; H04M 1/1615
See application file for complete search history.

(56) References Cited

U.S. PATENT DOCUMENTS

| | | | | |
|---|---|---|---|---|
| 4,760,593 A * | 7/1988 | Shapiro | ................. | H04M 11/04 379/38 |
| 7,016,656 B2 * | 3/2006 | Odashima | ............. | H04W 88/02 455/404.1 |
| 8,351,896 B2 * | 1/2013 | Purnadi | ................... | H04W 4/22 370/328 |
| 8,774,868 B2 * | 7/2014 | Niu | ..................... | H04W 52/027 345/589 |
| 9,075,612 B2 * | 7/2015 | Yang | ..................... | G06F 1/3262 |
| 2005/0096008 A1 * | 5/2005 | Shin | ................ | H04M 1/274566 455/404.1 |
| 2005/0124316 A1 * | 6/2005 | Islam | ...................... | H04L 12/66 455/404.2 |
| 2005/0130623 A1 * | 6/2005 | Narhi | ................ | H04M 1/72536 455/404.1 |
| 2005/0239477 A1 * | 10/2005 | Kim | .................... | H04W 76/007 455/456.1 |

(Continued)

FOREIGN PATENT DOCUMENTS

EP 1 892 983 B1 11/2010
FI GB 2334412 A * 8/1999 ........... G08B 25/016

*Primary Examiner* — Matthew Sams
(74) *Attorney, Agent, or Firm* — Patent Capital Group

(57) ABSTRACT

An example method for universal code for emergency calls mode in a network environment is provided and includes receiving an emergency call mode (ECM) code at an application framework layer of a phone, the ECM code being able to trigger an ECM procedure call in a telephony service of the application framework layer, and invoking the ECM procedure call, which instructs an operating system of the phone to enter an ECM, in which the phone is enabled to only make or receive calls and non-essential components of the phone that utilize battery power are disabled. The ECM code can be entered directly on a dial pad of the phone; the ECM code can also be received in a message from an authorized user. In specific embodiments, the non-essential components that are disabled include built-in sensors, wireless fidelity components, Bluetooth components and mobile data network components, applications, and background processes.

19 Claims, 4 Drawing Sheets

(56) References Cited

U.S. PATENT DOCUMENTS

| | | | |
|---|---|---|---|
| 2007/0049251 A1* | 3/2007 | Mock | H04L 63/0823 455/411 |
| 2007/0218859 A1* | 9/2007 | Wang | H04B 1/1615 455/343.1 |
| 2008/0020803 A1* | 1/2008 | Rios | H04M 1/667 455/565 |
| 2009/0149153 A1* | 6/2009 | Lee | H04M 1/72541 455/404.1 |
| 2010/0317314 A1* | 12/2010 | Roland | H04M 11/04 455/404.1 |
| 2011/0009172 A1* | 1/2011 | Song | H04M 1/72544 455/573 |
| 2011/0080422 A1* | 4/2011 | Lee | G06F 1/3203 345/589 |
| 2011/0088086 A1* | 4/2011 | Swink | G06F 3/04883 726/7 |
| 2011/0176481 A1* | 7/2011 | Purnadi | H04W 4/22 370/328 |
| 2011/0185319 A1* | 7/2011 | Carapelli | G06Q 20/206 715/863 |
| 2012/0071212 A1* | 3/2012 | Endo | G06F 3/0236 455/566 |
| 2012/0100824 A1* | 4/2012 | Michael | H04W 4/22 455/404.2 |
| 2012/0115430 A1* | 5/2012 | Hawkes | H04M 1/72536 455/404.1 |
| 2012/0309339 A1* | 12/2012 | Yang | H04W 48/02 455/404.1 |
| 2013/0035056 A1* | 2/2013 | Prasad | H04W 12/06 455/404.1 |
| 2013/0089015 A1 | 4/2013 | Choong | |
| 2013/0183946 A1* | 7/2013 | Jeong | H04W 4/16 455/414.1 |
| 2013/0190057 A1* | 7/2013 | Sahu | G06F 1/1694 455/566 |
| 2013/0231100 A1* | 9/2013 | Sharma | H04W 4/10 455/418 |
| 2014/0024330 A1* | 1/2014 | Chu | H04M 1/72541 455/404.1 |
| 2014/0051379 A1* | 2/2014 | Ganesh | H04M 1/72538 455/404.1 |
| 2014/0370836 A1* | 12/2014 | Gladstone | H04M 1/72536 455/404.1 |

* cited by examiner

UNIVERSAL CODE FOR EMERGENCY CALLS MODE IN A NETWORK ENVIRONMENT

TECHNICAL FIELD

This disclosure relates in general to the field of communications and, more particularly, to universal code for emergency calls mode in a network environment.

BACKGROUND

Wireless mobile devices, such as mobile phones, have widespread use today. Mobile devices can be important communications tools to alert people as soon as possible that their lives or property are seriously at risk. They are also particularly helpful in emergencies such as accidents, mishaps, or natural calamities, when victims in the emergencies can use the wireless mobile devices to inform rescue teams, friends, and others about their location and situation. In such desperate situations, the user may want to conserve battery power of the wireless mobile device, for example, to make or await emergency calls over a long period of time.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for universal code for emergency calls mode in a network environment is provided and includes receiving an emergency call mode (ECM) code at an application framework layer of a phone, the ECM code being able to trigger an ECM procedure call (e.g., a sequence of program instructions including an inter-process communication that perform one or more specific tasks) in a telephony service (e.g., software that allows communication capabilities using voice, video and/or data) of the application framework layer, and invoking (e.g., activating, calling, enabling, starting, initiating, triggering, etc.) the ECM procedure call, which instructs an operating system of the phone to enter an ECM, in which the phone is enabled to only make or receive calls and non-essential (e.g., a functionality that is not necessary for call handling (e.g., receiving or sending calls) components of the phone that utilize battery power are disabled. The ECM code can be entered directly on a dial pad of the phone; in some embodiments, the ECM code can also be received in a message from an authorized user.

As used herein, the term "application framework" encompasses any software components that provide a basis for constructing higher-level applications. In a general sense, applications use (e.g., call, activate, initiate, etc.) software components (e.g., processes, libraries, functions, objects, tools, etc.) of the application framework layer to operate in the phone. As used herein, the term "phone" includes any wireless communication device that is capable of exchanging information in a cellular network environment, and can include, by way of examples and not as limitations, mobile phones, smart mobile phones, tablets, portable navigation systems, and multimedia devices. In a general sense, phones are at least capable of initiating a wireless communication session ("call") and receiving (e.g., accepting) a wireless communication session.

Example Embodiments

Figure 1:
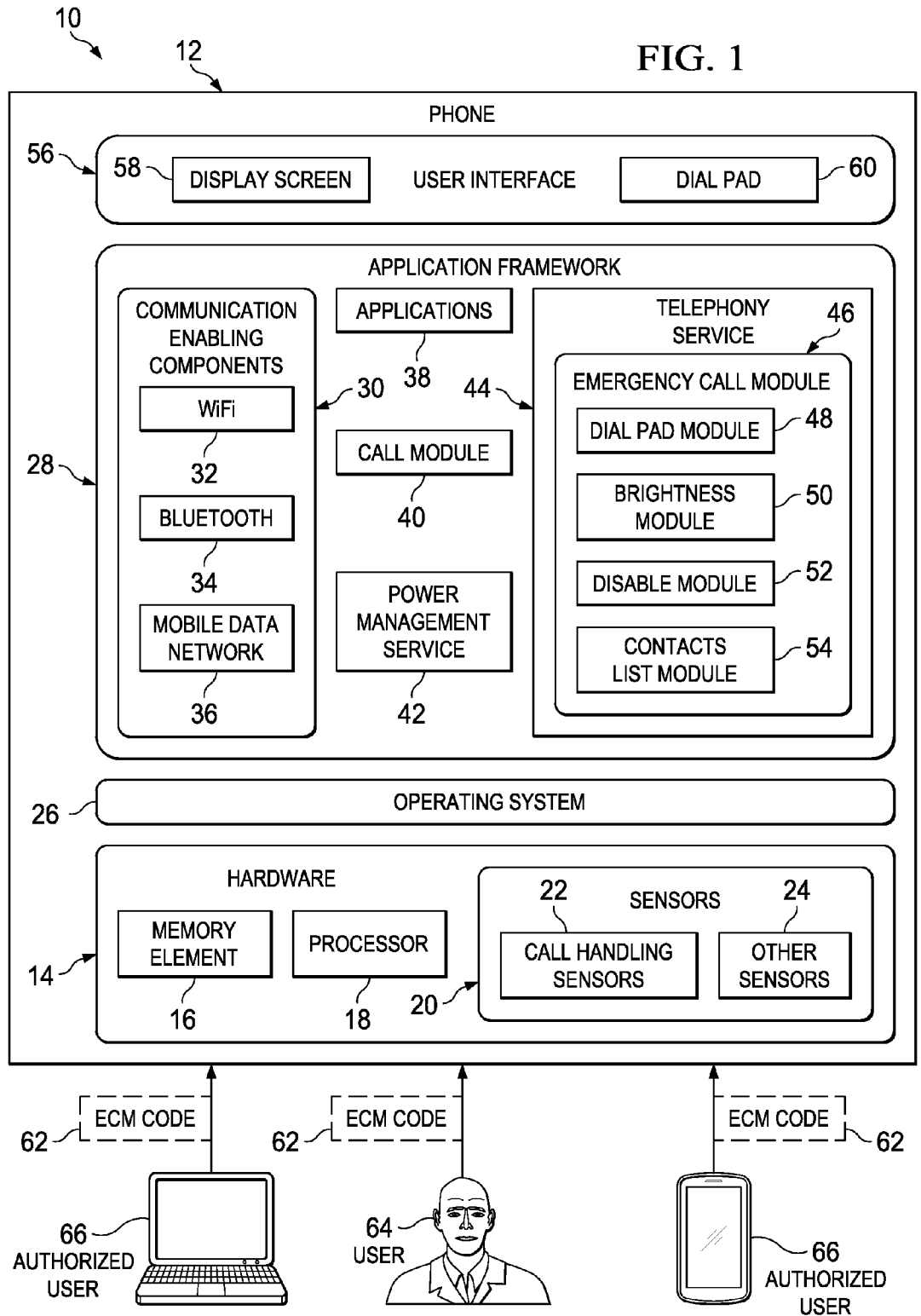
FIG. 1 is a simplified block diagram illustrating a communication system that facilitates universal code for emergency calls mode in a network environment.

Turning to FIG. 1, FIG. 1 is a simplified block diagram illustrating a communication system 10 for universal code for emergency calls mode in a network environment in accordance with one example embodiment. Communication system 10 includes a phone 12 comprising hardware 14. By way of examples, and not as limitations, hardware 14 comprises a memory element 16, a processor 18, and sensors 20, which can include call handling sensors 22 and other sensors 24. Phone 12 can include an operating system 26 and application framework 28. Application framework 28 can include one or more communication enabling components 30, for example, wireless fidelity (Wi-Fi) components 32, Bluetooth components 24, and mobile data network components 36. Application framework 28 can also include applications 38, a call module 40 and a power management service 42. A telephony service 44 in application framework 28 can include an emergency call module 46, which can include a dial pad module 48, a brightness module 50, a disable module 52, and a contacts list module 54.

Phone 12 can also include a user interface 56, which can include a display screen 58 and a dial pad 60. In some embodiments, dial pad 60 may be a physical keypad with letters and numbers printed on keys. In other embodiments, dial pad 60 may comprise a software application that presents an array of letters and/or numbers on display screen 58. Display screen 58 may be configured to sense touch, gestures, etc. directed to the dial pad area of the screen to interpret selections on dial pad 60.

According to various embodiments, phone 12 is configured to receive and respond appropriately to a universal emergency call mode (ECM) code 62 from a user 64, or an authorized user 66. User 64 comprises a human or human agent (e.g., robotic arm, robot, etc.); authorized user 66 can comprise another phone operated by a trusted person of the user, for example, the user's family member or friend; authorized user 66 can also include a network element (e.g., computer, server, or other device) operated by a trusted (e.g., authorized) entity, such as the wireless service provider, government, police, medical rescue personnel, etc.

As used herein, the term "ECM code" can comprise any Universal Code (e.g., understood, interpretable, etc., by a majority of telecommunications carriers and phones) to enable an 'Emergency Calls only Mode' in the phones and/or to restrict non-essential embedded components that utilizes battery power. For example, phone 12 may be configured to enable ECM to optimize battery usage (e.g., utilize battery reserve) upon trigger by universal ECM code 62. According to some embodiments, ECM code 62 can comprise a three number (or letter) format such as *xyz#, *#xyz#, *xyz, to enter ECM. In one example, ECM code 62 may comprise *326#. ECM code 62 can be used as a universal standard by substantially all mobile phone manufacturers and service providers. ECM code 62 may correspond to the letters used in general for emergency situation, such as SOS (*767#), or ECM (*326#), etc. In a general sense, ECM code 62 may comprise any suitable combination of letters, numbers, and non-alpha-numeric symbols within the broad scope of the embodiments of communication system 10.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Phones typically provide various functionalities via built-in applications and interfaces. Many of the applications utilize lot of resources like battery power, network bandwidth, processors and memory elements. Users of the phones may face situations where there is a need to preserve the smart phone's resources, for example, battery power, to make or await emergency calls. For example, the user may be stranded on a highway and awaiting a rescue call; the user may be trapped in natural disasters like an earthquake or an avalanche; the user may be trapped in a collapsed building or mine. Various other such situations may be envisioned where there is a need to conserve the smart phone's resources to enable the user to make and receive important calls.

Many phones available in the market today include several built in applications and sensors that operate or execute substantially continuously, for example, as a background process, to provide enhanced user experience. For example, the display screen; sensors like proximity sensor, accelerometer, gyroscope, etc.; communication modules like Wi-Fi, Bluetooth, 3G data network, GPS, etc.; and other such applications and sensors may use battery power substantially continuously. Many of the components and associated monitoring applications may run in the background and consume battery power.

Several third party applications and features in smart phone operating systems are available to turn the system into a power saving mode. However, such applications and features typically do not disable many of the sensors and background applications in an emergency situation, specifically. According to an example application, the phone can receive an authorization message from an authority; the authorization message can force the phone into an enhanced operating mode if authenticated; certain power saving features may be enabled in the enhanced operating mode. The authorization message includes instructions for the phone to enable the enhanced operating mode. The power saving mode of the enhanced operating mode is triggered if battery power is low, and includes disabling a receiver functionality (such that the phone can only transmit information) and using reserve battery power. The mechanism does not include disabling certain hardware and other features of the phone.

Some mechanisms exist to operate in low battery situations, but do not include interfacing with the phone's operating system to disable hardware and other components. An example mechanism allows a user to send a short message service (SMS) message to an emergency SMS address when a low battery has been detected on the phone. Another example mechanism permits the phone to receive an emergency mode request from the user. The emergency mode is implemented to monitor received signals to locate a base station, transmit an emergency signal (e.g., request for help) and conserve power while awaiting emergency assistance. In the power saving mode, various non-essential functions, such as the display and sound are reduced or eliminated. In addition, various secondary non-essential functions can be reduced, such as turning off GPS location function and entering an emergency sleep mode. However, such mechanisms do not specifically purport to disable built in sensors and change the display settings to conserve power.

Communication system 10 is configured to address these issues (and others) in offering a system and method for facilitating universal code for emergency calls mode in a network environment. According to an embodiment of communication system 10, ECM code 62 may be received at an application framework 28 of phone 12, ECM code 62 being capable of triggering an ECM procedure call by emergency call module 46 in telephony service 44 of application framework 28. Application framework 28 may invoke the ECM procedure call, which may instruct operating system 26 to enter ECM, in which phone 12 is enabled to only make or receive calls and non-essential components of phone 12 that utilize battery power are disabled. ECM code 62 can be entered directly on dial pad 60 by user 64.

ECM code 62 can also be received in a message from authorized user 66. Application framework 28 may authenticate the message from authorized user 66 before invoking the ECM procedure call. In some embodiments, the operating system may provide an 'in-case-of-emergency' (ICE) list comprising a list of contact to call or reach out to in case of an emergency. The contacts listed on the ICE list may be included as authorized user 66. For example, any contact on the ICE list may send ECM code 62. During authentication, application framework 28 may check the sender's number with the ICE list and determine if a match exists. ECM code 62 may be rejected if no match exists. In another embodiment, user 64 may manually enter a list of contacts designated as authorized to send ECM code 62. When ECM code 62 is received from a sender (and not entered by user 64), application framework 28 may check the sender's number with the pre-populated list of authorized contacts and determine if a match exists. ECM code 62 may be rejected if no match exists.

During normal mode of operation (e.g., when not in ECM), phone 12 may make and receive calls using call module 40. Power management service 42 may monitor the power usage and manage power consumption generally. Applications 38 may comprise various background and foreground software processes, for example, that enhance user experience. In the normal mode of operation, display screen 58 may comprise a multi-color display and dial pad 60 may have enhanced functionalities, like colors, special fonts, symbols, etc. Other sensors 24 may sense phone direction, phone position, phone movement, user gestures, etc. Communication enabling components 30 (which can include global positioning system (GPS)) may provide enhanced communication capabilities, including connecting to wireless local area networks, Bluetooth devices, email, Internet browsing, etc.

In specific embodiments, in ECM, operating system 26 may cause display of a customized dial pad on user interface 56, the customized dial pad being configured to show only numbers and a call connect/disconnect icon without any background colors. In some embodiments, the numbers are displayed in single color, large font (e.g., easy to read font) format with multicolor display disabled. For example, numbers may be displayed in a seven segment light emitting diode (LED) format; in another example, numbers may be displayed in a simple format (e.g., sans serif, without additional design embellishments, etc.). In some embodiments, in ECM, operating system 26 may disable a portion of a touch screen outside the dial pad area on user interface 56. Operating system 26 may also reduce a screen brightness to a minimum possible level in ECM according to ambient light conditions measured before entering ECM. In addition, the display screen may be disabled when a call is connected.

In some embodiments, the non-essential components that are disabled in ECM include built-in sensors 24 that are not call handling sensors 22, wireless fidelity components 32, Bluetooth components 34 and mobile data network components 36, applications 38, including background processes. Thus, only call module 40, call handling sensors 22, processor 18, memory element 16, and other essential functionalities necessary for call handling may be rendered active, while all other functionalities and components maybe disabled. In some embodiments, in ECM, an incoming call that is not answered within a predetermined time period (e.g., 10 seconds) may be automatically connected in hands-free mode (e.g., with a speaker phone enabled on phone 12). Phone 12 may return to a normal mode of operation from ECM when phone 12 is connected to an external power source.

In ECM, brightness module 50 may cause the phone screen brightness to be reduced considerably, and a backlight may be turned off. In embodiments where dial pad 60 is a software application, dial pad 60 may be modified by dial pad module 48 from a regular display to an ECM display, for example, where letters and numerals are displayed in a single color seven segment light emitting diode (LED) format. Underlying operating system 26 may be instructed to enter ECM, in which mode calls can be sent or received with substantially no other functionalities (e.g., camera, background applications, etc.). Other communication enabling functionalities such as Wi-Fi, Bluetooth and other sensors may be deactivated based on instructions from disable module 52. Phone 12 may be configured to automatically receive and respond to calls from authorized users 66 (e.g., with approval of service provider). In some embodiments, phone speakers may be enabled after a predetermined time interval (e.g., 10 seconds) during the auto-receive mode, for example, if user 64 is not responding to a received call during ECM.

In many embodiments, ECM may be entered in one of at least two ways: (1) user 64 enters ECM code 62 using dial pad 60; (2) authorized user 66 triggers ECM code 62 with appropriate approval (e.g., preauthorization from user 64; government directive; service provider authorization, etc.), for example, in case of natural disasters like earthquake, tsunami, etc. In some embodiments, phone 12 may emerge out of ECM by one of at least two mechanisms: (1) when phone 12 is connected to a power source; and (2) a trigger from the service provider upon consent by user 64.

Turning to the infrastructure of communication system 10, phone 12 may be used in any suitable network topology, which can include any number of servers, hardware accelerators, virtual machines, switches and routers, and other nodes inter-connected to form a large and complex network. A node may be any electronic device, client, server, peer, service, application, or other object capable of sending, receiving, or forwarding information over communications channels in a network. Phone 12 may be coupled to other phones (e.g., authorized users 66) through one or more interfaces employing any suitable wireless connection, which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment may be configured over a physical infrastructure that may include one or more networks and, further, may be configured in any form including, but not limited to, local area networks (LANs), wireless local area networks (WLANs), cellular networks, virtual local area networks (VLANs), metropolitan area networks (MANs), wide area networks (WANs), Intranet, Extranet, any other appropriate architecture or system, or any combination thereof that facilitates communications in a network. In some embodiments, a communication link may represent any electronic link supporting a wireless environment such as, for example, wireless technologies (e.g., IEEE 802.11x). In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

Note that the blocks shown in the FIGURE are simplified for ease of illustration. For example, although only emergency call module 46 is shown within telephony service 44, various other modules may be included in telephony service 44. Moreover, other modules, such as communication enabling components 30 and applications 38 may also be included in telephony service 44 without departing from the broad scope of the embodiments. Similarly, user interface 56 may include speakers and other components not illustrated herein. Various other functional modules and components may be included in phone 12 without departing from the scope of the embodiments described herein.

Figure 2:
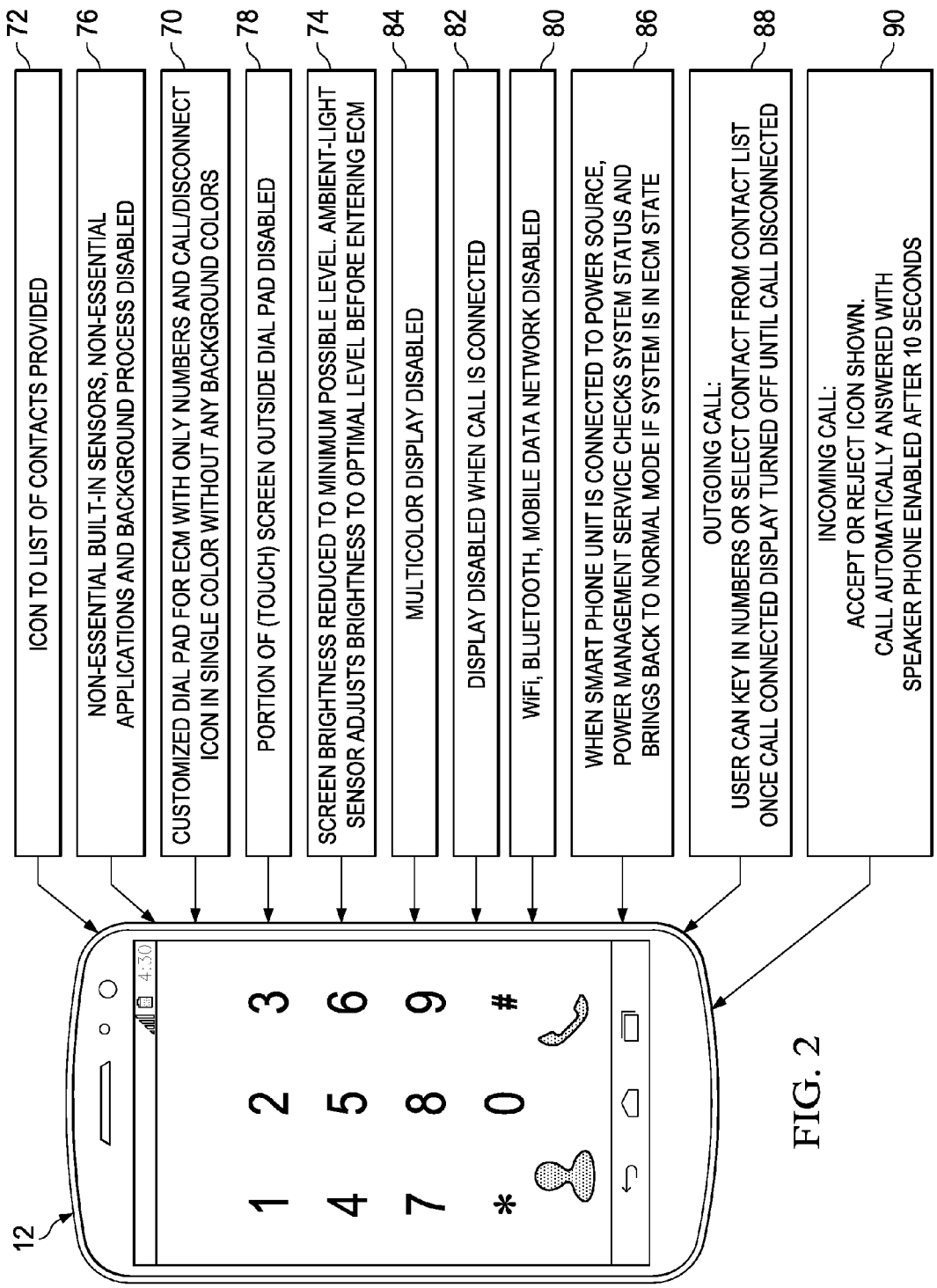
FIG. 2 is a simplified block diagram illustrating example details of an embodiment of the communication system.

Turning to FIG. 2, FIG. 2 is a simplified block diagram illustrating example details of an embodiment of communication system 10 wherein phone 12 is in ECM. For example, dial pad module 48 may cause a customized dial pad to be displayed during ECM. At 70, an example customized dial pad is indicated, with only numbers and a call connect/disconnect icon in single color without any background colors. At 72, an icon to a list of contacts may be displayed by contacts list module 54. At 74, brightness module 50 may reduce screen brightness to a minimum possible level (e.g., wherein the display on the screen is visible according to the ambient light). An ambient light sensor may measure brightness before disable module 52 disables other sensors 24 during ECM (e.g., screen brightness may be adjusted automatically according to ambient light measurements made just before entering ECM). At 76, non-essential built-in sensors 24, non-essential applications 38 and background processes may be disabled by disable module 52.

In some embodiments, for example, where display screen 58 comprises a touch screen (e.g., that responds to the user's touch and other gestures), at 78, a portion of the touch screen outside dial pad 60 may be disabled (e.g., visible, but rendered inactive in one example). At 80, communication enabling components 30 such as Wi-Fi 32, Bluetooth 34 and mobile data network 36 may be disabled. At 82, disable module 52 may disable the entire display on display screen 58 when a call is connected. At 84, disable module 52 may disable multicolor display. At 86, when phone 12 is connected to an external power source (e.g., external power outlet, battery pack, etc.), power management service 42 may check a system status and bring back phone 12 to a normal mode if phone 12 is in ECM.

At 88, for substantially all outgoing calls, user 64 may be allowed to key in numbers on dial pad 60 or select a contact from the contacts list. After the outgoing call is connected, display screen 58 may be rendered inactive (e.g., turned off) until the call is disconnected. At 90, for substantially all incoming calls, an 'accept' or 'reject' icon may be displayed. User 64 may select the 'accept' icon to connect the call, or the 'reject' icon to ignore the call. In some embodiments, the call may be automatically answered after a predetermined time period (e.g., 10 seconds) in hands-free mode (e.g., with speaker phone enabled). For example, users trapped in buildings or avalanches, who cannot reach the phone, although nearby, may find this feature helpful.

In some embodiments, time, battery level and signal strength (e.g., strength of wireless or cellular signal) may also be displayed on dial pad 60. Time, battery level and signal strength may be included in essential services (e.g., functions) of phone 12 (e.g., they may be excluded from non-essential services and components). When phone 12 is in ECM, in addition to making and receiving calls, such essential services may be available for use in phone 12.

Figure 3:
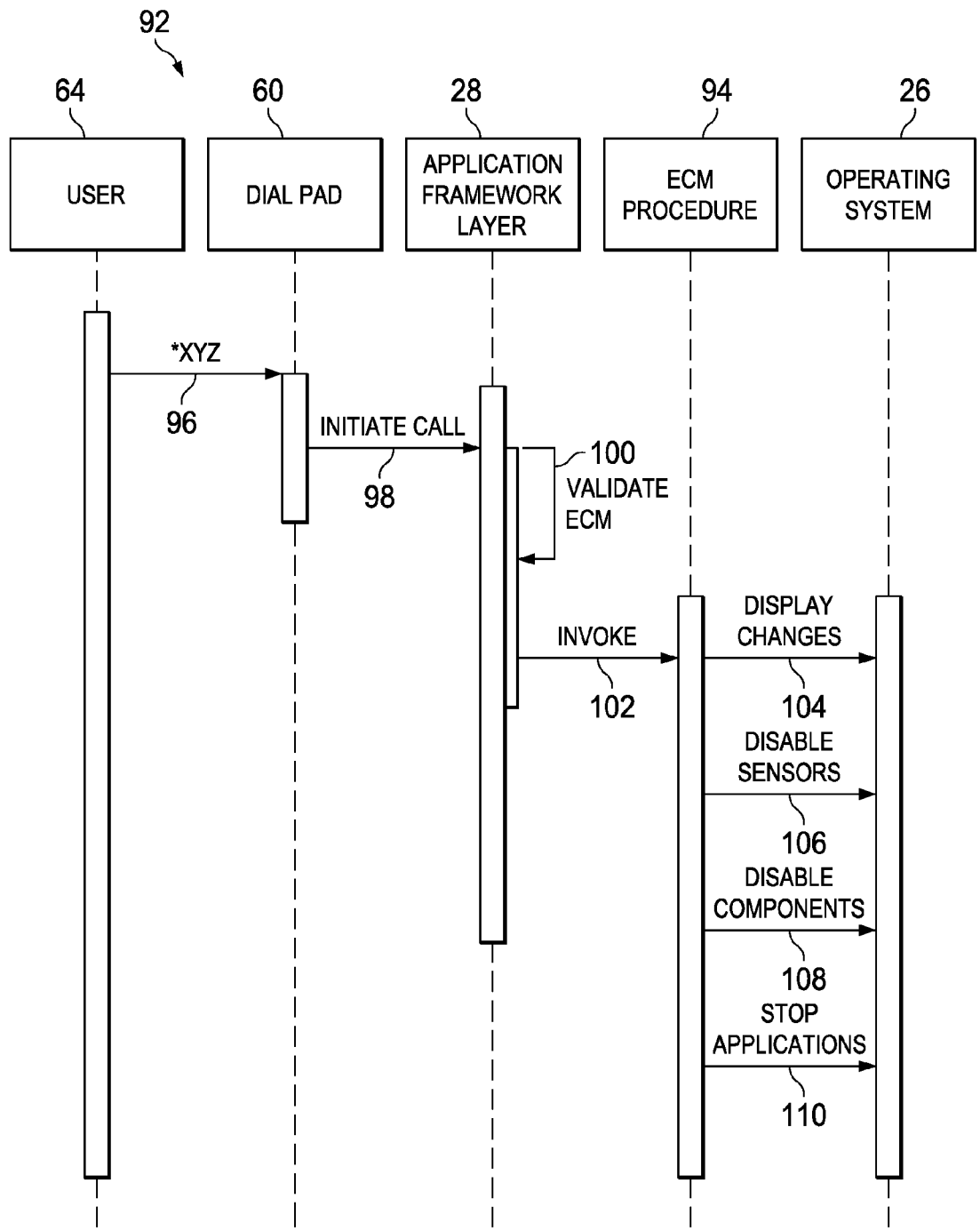
FIG. 3 is a simplified sequence diagram illustrating example operations that may be associated with an embodiment of the communication system.

Turning to FIG. 3, FIG. 3 is a simplified sequence diagram illustrating example operations 92 that may be associated with an embodiment of communication system 10. Various entities, such as user 64, dial pad 60, application framework layer 28, an ECM procedure 94 executing in emergency call module 46 and operating system 26 may interact to implement operations 92. At 96, user 64 may enter (e.g., type, gesture, key in, etc.) ECM code 62 (e.g., *XYZ) on dial pad 60. At 98, dial pad 60 may initiate a call to application framework layer 28. At 100, application framework layer 28 may validate ECM. At 102, application framework layer 28 may invoke ECM procedure 94. ECM procedure 94 may instruct operating system 26 to change display screen 58 at 104; disable sensors 24 at 106; disable components (e.g., communication enabling components 30) at 108; and stop applications 38 at 110.

Figure 4:
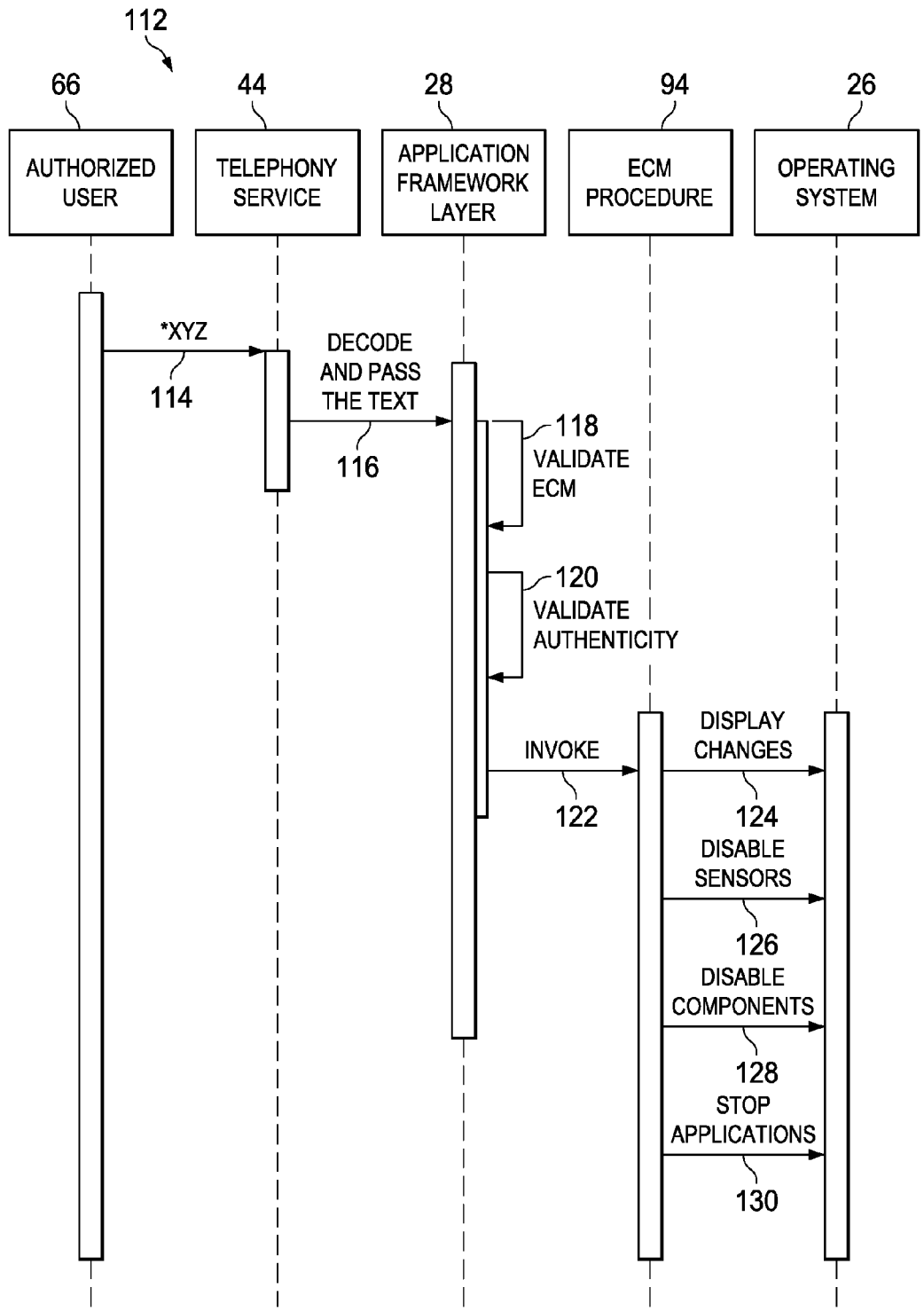
FIG. 4 is a simplified sequence diagram illustrating other example operations that may be associated with an embodiment of the communication system.

Turning to FIG. 4, FIG. 4 is a simplified sequence diagram illustrating example operations 112 that may be associated with an embodiment of communication system 10. Authorized user 66 can send ECM code 62 in a text message to phone 12. In case of a natural calamity, ECM code 62 can be broadcasted to substantially all mobile service users or users in the affected area; unaffected users can connect to a power source to return to normal mode. In some scenarios, for example, if a person is missing, authorized user 66 can be close family or friend, who can send the code to assist the missing person conserve battery power. In yet other situations, for example, if the user(s) are trapped in a collapsed building or mine or trapped in an unreachable location, authorized user 66 can send ECM code 62 in a text message to their respective phones. In some embodiments, if phone 12 is locked, user 64 may be prompted to accept or reject the ECM message from authorized user 66 within 60 seconds. Failing to get a response from user 64, phone 12 may enter into ECM automatically.

Various entities, such as authorized user 66, telephony service 44, application framework layer 28, ECM procedure 94 executing in emergency call module 46 and operating system 26 may interact to implement operations 112. At 114, authorized user 66 may send a text message (or other suitable message) comprising ECM code 62 (e.g., *XYZ). At 116, telephony service 44 may decode and pass the text to application framework layer 28. At 118, application framework layer 28 may validate ECM. At 120, application framework layer 28 may validate authenticity of the message from authorized user 66 (e.g., determine if authorized user 66 is indeed authorized to send ECM code 62, determine if the text message is from authorized user 66, etc.). At 122, application framework layer 28 may invoke ECM procedure 94. ECM procedure 94 may instruct operating system 26 to change display screen 58 at 124; disable sensors 24 at 126; disable components (e.g., communication enabling components 30) at 128; and stop applications 38 at 130.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, phone 12. In some embodiments, one or more of these features may be implemented in hardware, provided external to these elements, or consolidated in any appropriate manner to achieve the intended functionality. The various network elements (e.g., phone 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, phone 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 16) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 18) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving an emergency call mode (ECM) code from a sender number at an application framework layer of a phone, wherein the ECM code can trigger an ECM procedure call in a telephony service of the application framework layer, wherein the ECM code comprises a universal code including a unique combination of letters, numbers and non-alphanumeric symbols understood by telecommunications carriers and phones to trigger ECM;
authenticating the sender number, comprising looking up in the phone an in-case-of-emergency (ICE) contact list having a list of phone numbers of users authorized to send the ECM code to the phone;
accepting the ECM code if the sender number matches one of the entries in the ICE list, and rejecting the ECM code if the sender number does not match any of the entries in the ICE list; and
invoking the ECM procedure call if the ECM code is accepted, wherein the ECM procedure call instructs an operating system of the phone to enter ECM, wherein the phone is enabled to only make or receive calls and non-essential components of the phone that utilize battery power are disabled in ECM.

2. The method of claim 1, wherein the ECM code is received in a text message from the sender number.

3. The method of claim 2, wherein the application framework layer authenticates the text message before invoking the ECM procedure call.

4. The method of claim 1, wherein the operating system causes display of a customized dial pad on a user interface of the phone in ECM, wherein the customized dial pad shows only numbers and a call connect/disconnect icon without any background colors.

5. The method of claim 4, wherein the numbers are displayed in single color, with multicolor display disabled.

6. The method of claim 4, wherein the operating system disables a portion of a touch screen outside the dial pad area on the user interface in ECM.

7. The method of claim 4, wherein the operating system reduces a screen brightness to a minimum possible level in ECM according to ambient light conditions measured before entering ECM.

8. The method of claim 4, wherein the operating system disables a display screen when a call is connected in ECM.

9. The method of claim 1, wherein the non-essential components include built-in sensors, wireless fidelity components, Bluetooth components and mobile data network components, applications, and background processes.

10. The method of claim 1, further comprising returning to a normal mode from ECM when the phone is connected to an external power source.

11. The method of claim 1, wherein an incoming call that is not answered within a predetermined time period is automatically connected in hands-free mode in ECM.

12. Non-transitory tangible media that includes instructions for execution, which when executed by a processor of a phone, is operable to perform operations comprising:
receiving an ECM code from a sender number at an application framework layer of the phone, wherein the ECM code can trigger an ECM procedure call in a telephony service of the application framework layer, wherein the ECM code comprises a universal code including a unique combination of letters, numbers and non-alphanumeric symbols understood by telecommunications carriers and phones to trigger ECM;
authenticating the sender number, comprising looking up in the phone an ICE contact list having a list of phone numbers of users authorized to send the ECM code to the phone;
accepting the ECM code if the sender number matches one of the entries in the ICE list, and rejecting the ECM code if the sender number does not match any of the entries in the ICE list; and
invoking the ECM procedure call if the ECM code is accepted, wherein the ECM procedure call instructs an operating system of the phone to enter an ECM, wherein the phone is enabled to only make or receive calls and non-essential components of the phone that utilize battery power are disabled in ECM.

13. The media of claim 12, wherein the ECM code is received in a text message from the sender number.

14. The media of claim 12, wherein the non-essential components include built-in sensors, wireless fidelity components, Bluetooth components and mobile data network components, applications, and background processes.

15. An apparatus, comprising:
a memory element for storing data; and
a processor, wherein the processor executes instructions associated with the data, wherein the processor and the memory element cooperate, such that the apparatus is configured for:
receiving an ECM code from a sender number at an application framework layer of the apparatus, wherein the ECM code can trigger an ECM procedure call in a telephony service of the application framework layer, wherein the ECM code comprises a universal code including a unique combination of letters, numbers and non-alphanumeric symbols understood by telecommunications carriers and phones to trigger ECM;
authenticating the sender number, comprising looking up in the phone an ICE contact list having a list of phone numbers of users authorized to send the ECM code to the phone;
accepting the ECM code if the sender number matches one of the entries in the ICE list, and rejecting the ECM code if the sender number does not match any of the entries in the ICE list; and
invoking the ECM procedure call if the ECM code is accepted, wherein the ECM procedure call instructs an operating system of the apparatus to enter an ECM, wherein the apparatus is enabled to only make or receive calls and non-essential components of the apparatus that utilize battery power are disabled in ECM.

16. The apparatus of claim 15, wherein the ECM code is received in a text message from the sender number.

17. The apparatus of claim 15, wherein the non-essential components include built-in sensors, wireless fidelity components, Bluetooth components and mobile data network components, applications, and background processes.

18. The apparatus of claim 15, wherein the operating system causes display of a customized dial pad on a user interface of the phone in ECM, wherein the customized dial pad shows only numbers and a call connect/disconnect icon without any background colors.

19. The media of claim 12, wherein the operating system causes display of a customized dial pad on a user interface of the phone in ECM, wherein the customized dial pad shows only numbers and a call connect/disconnect icon without any background colors.

* * * * *